United States Patent [19]

Sheen

[11] Patent Number: 4,785,723
[45] Date of Patent: Nov. 22, 1988

[54] SEPARATIVE TEA BREWING APPARATUS

[76] Inventor: Shuenn T. Sheen, No. 328, Sec. 1, Chung Shan Rd., Pu Li Chen, Nan-Tou Hsien, Taiwan

[21] Appl. No.: 172,440

[22] Filed: Mar. 24, 1988

[51] Int. Cl.⁴ ............................................. A47J 31/10
[52] U.S. Cl. ...................................... 99/279; 99/299; 99/306; 99/323
[58] Field of Search ................. 99/279, 299, 306, 305, 99/316, 317, 323, 295, 298; 426/433

[56] References Cited

U.S. PATENT DOCUMENTS

| | | | |
|---|---|---|---|
| 2,069,229 | 2/1937 | Ferris | 99/299 |
| 2,951,431 | 9/1960 | Hugentobler | 99/299 |
| 3,333,528 | 8/1967 | Bender | 99/299 |
| 3,853,043 | 12/1974 | Stavropoulos | 99/299 |
| 3,858,493 | 1/1975 | Hermsen | 99/306 |

*Primary Examiner*—Robert W. Jenkins
*Attorney, Agent, or Firm*—Staas & Halsey

[57] ABSTRACT

A tea brewing apparatus comprising an upper container for simmering tea therein and a lower container for storing the tea brewed in the upper container. The bottom face of the upper container is provided with a tea dripping hole for allowing tea which was brewed in the upper container to flow into the lower container. A ball-activated sieve with an arched stem is disposed in the upper container and above the dripping holes so as to prevent tea leaves from dropping into the lower container. A steel ball disposed inside the sieve is attached to a distal end of a steel wire encompassed by the stem so that the steel ball seals the dripping hole when it is positioned on the dripping hole. A suspending element is attached to the other distal end of the steel wire outside the upper container so as to remotely control the movements of the sealing ball.

3 Claims, 5 Drawing Sheets

SEPARATIVE TEA BREWING APPARATUS

BACKGROUND OF THE INVENTION

The present invention relates to a separative tea brewing apparatus wherein the tea leaves are brewed by hot or boiling water in an upper container. After being brewed, the tea is funneled into and stored in a lower container so as to prevent the tea from getting bitter due to a prolonged soakage of tea leaves in the upper container.

In recent years, tea has become a internationally popular beverage due to its characteristic essence healthy to people. Therefore, methods used for brewing tea are often quite meticulous. The species of tea leaves, the material of the container, the quality and the temperature of water, and the brewing time are all precisely controlled. The tea set should be made as simple to use as possible in order to be broadly accepted by the people who do not usually drink tea. Therefore, the tea set is designed to merely comprise a few parts which can act as a whole tea brewing apparatus, as described in U.S. patent application Ser. No. 921,108 filed Oct. 21, 1986, now U.S. Pat. No. 4,739,696 by the same applicant. Tea becomes bitter and its taste become worse if the tea leaves are brewed too long. Therefore, the tea after being brewed should be kept apart from the tea leaves. Accordingly, it would require more containers other than the one in which tea leaves are stored and tea is brewed. The present invention is hence designed to comprise two separative containers in an apparatus for respectively brewing the tea and storing the tea.

SUMMARY OF THE INVENTION

A primary object of the present invention is to provide a separative tea brewing apparatus which comprises simple elements and is easy to operate.

Another object of the present invention is to provide a separative tea brewing apparatus which comprises an upper container for brewing the tea and a lower container for storing the tea.

Still another object of the present invention is to provide a separative tea brewing apparatus wherein a control device is used to remotely control the tea flow from the upper container to the lower container.

Another objective of the present invention is to provide a separative tea brewing apparatus wherein a top cover has a plurality of feet on the lower outer surface side so that the upper container can be received by the cover.

Still another objective of the present invention is to provide a separative tea brewing apparatus wherein a gripping ring is provided on the upper exterior of the upper container to prevent the user from being scalded while the upper container is heated by hot and boiling water.

Another objective of the present invention is to provide a separative tea brewing apparatus wherein a seat is provided to isolate the lower container and the table.

Further objects and advantages of the present invention will become apparent as the following description proceeds, and the features of novelty which characterize the invention will be pointed out with particularity in the claims annexed to and forming a part of this disclosure.

DETAILED DESCRIPTION OF THE PREFERRED EMBODIMENT

Figure 1:
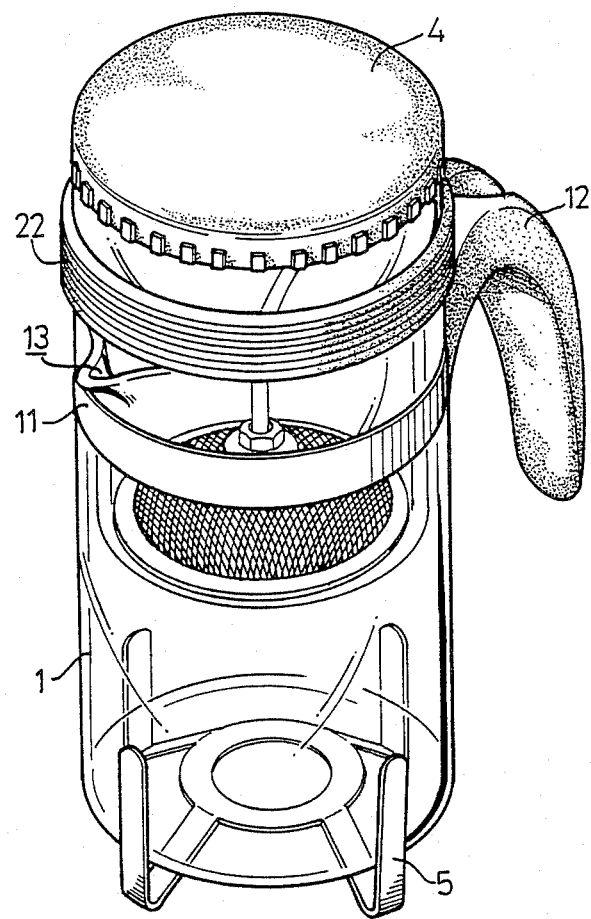
FIG. 1 is a perspective view of a separative tea brewing apparatus according to the present invention.
Figure 2:
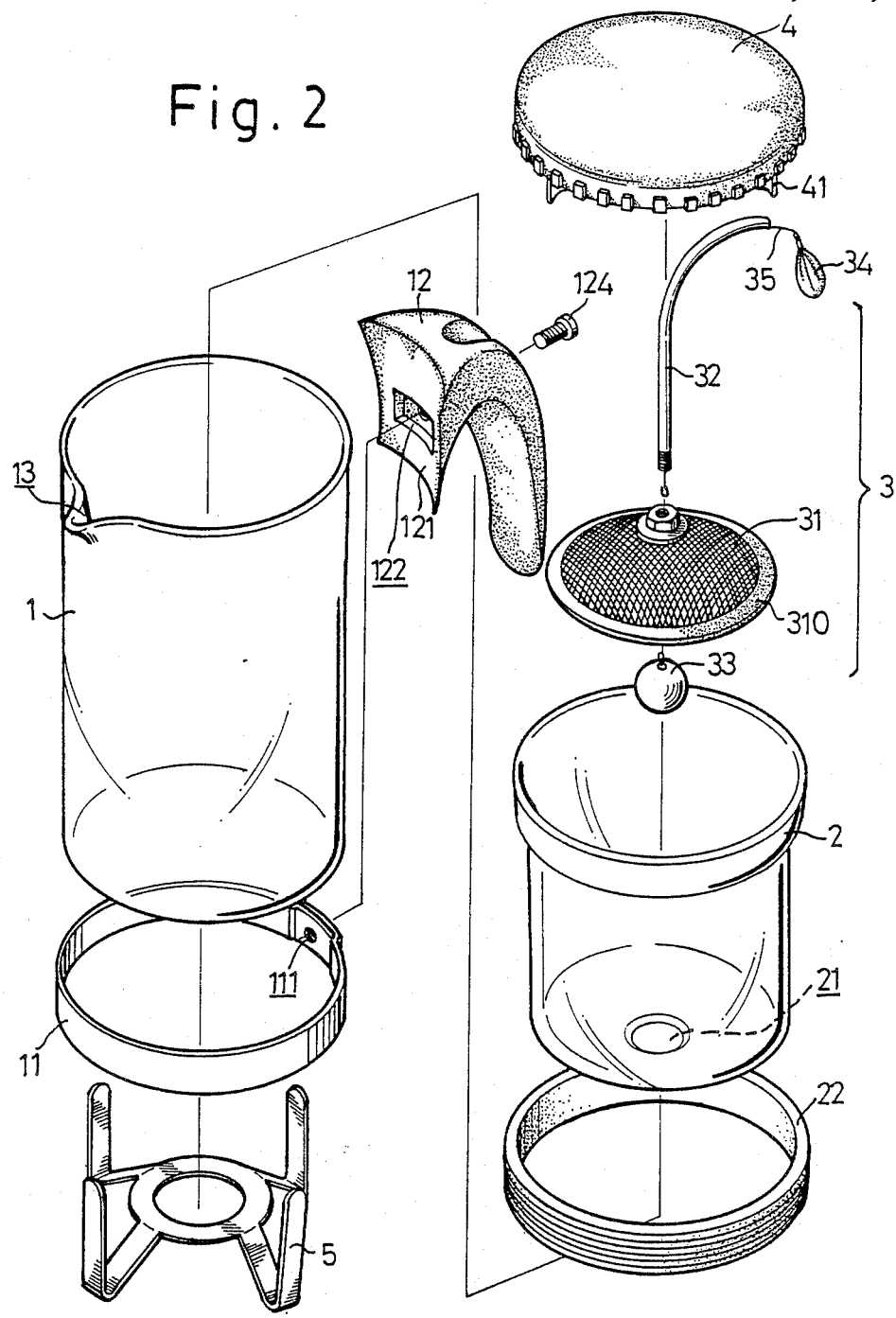
FIG. 2 is an exploded view of the tea brewing apparatus of FIG. 1.

Referring to FIGS. 1 and 2, it can be seen that the separative tea brewing apparatus, as a preferred embodiment of the present invention, comprises a lower container 1, an upper container 2 which is disposed on the lower container 1, a ball-activated sieve 3 which is disposed in the upper container 2, a top cover 4, a handle 12, and a seat 5.

The lower container 1 is made of glass or any material which is safe for use as a high-temperature food container. The lower container 1 has a shape like a cylindrical cup with a spout 13 formed on the upper edge thereof. The seat 5 is provided to receive the lower container 1 so that the lower container 1 can be isolated from any external support surfaces. Therefore the separative tea brewing apparatus can be disposed on the table whether or not the table is heat-resistant.

The upper container 2 is made of glass or a like material and has a stepped circumferential wall with the outer diameter of the lower portion thereof slightly smaller than that of the upper portion thereof. Therefore, the upper container 2 can be disposed on the upper edge of the lower container 1 while the lower portion of the upper container 2 can be inserted into the inner space of the lower container 1. The bottom face of the upper container 2 slopes downward from the periphery thereof to the center thereof. Further, the center of the bottom face of the upper container 2 is in a funnel shape, with a dripping hole 21 for draining the tea from the upper container 2 into the lower container 1. Moreover, a grasping ring 22 is provided on the exterior of the upper portion of the upper container 2 for the user to grip when he wants to detach the upper container 2 from the lower container 1.

The ball-activated sieve 3 comprises a sieve 31, an arched hollow stem 32 which is threadably received at the center of the upper side of the seive 31. The sieve 31 is semispherical and a securing ring 310 made of silicon rubber or the like encircles the peripheral edge of the sieve 31 so that the sieve 31 can be secured on the bottom face of the upper container 2. The sieve 31 retains tea leaves in the upper container 2. Moreover, a steel ball 33 and a suspending element 34 are connected by a steel wire 35 which is encompassed by the stem 32. The steel ball 33 is secured to a distal end of the steel wire 35 inside the sieve 31 for sealing the dripping hole. The diameter of the ball 33 is larger than the bore of the dripping hole 21 so that the ball 33 can be maintained at the top of the dripping hole 21 and prevent tea from draining into the lower container 1. The suspending element 34 is secured to the other distal end of the steel wire 35 opposite to the ball 33 and outside the upper container 2 for remotely controlling movements of the steel ball 33. The length of the steel wire 35 between the ball 33 and the suspending element 34 is appropriately determined (to be described hereinafter).

Figure 3:
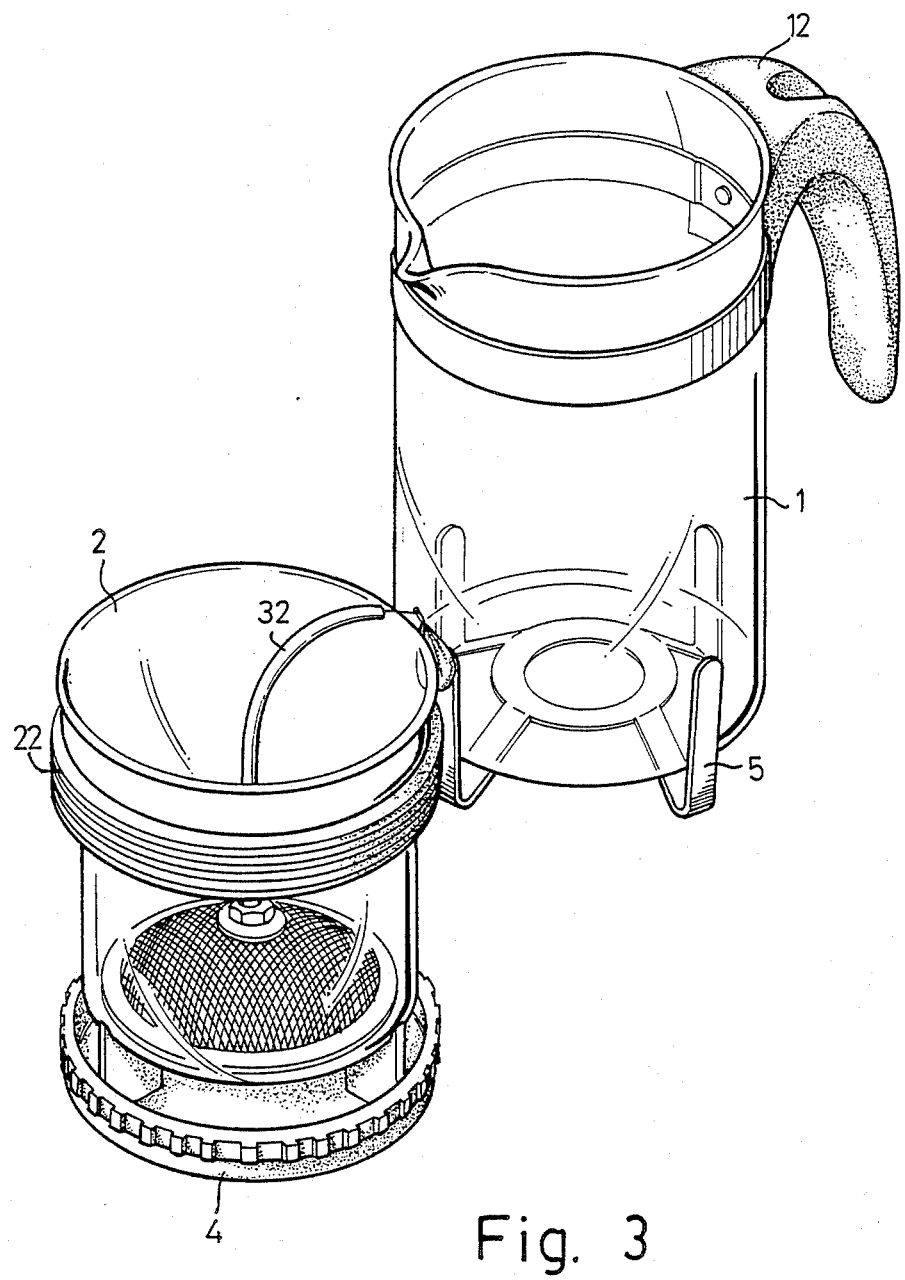
FIG. 3 is a perspective view of the tea brewing apparatus of FIG. 1, wherein the upper container is detached from the lower container and is disposed on a top cover.

The top cover 4 is detachably disposed on the top edge of the upper container 2 to prevent the hot vapor therein from flowing out. The top cover 4 has a plurality of feet 41 on the lower outer surface thereof so that the upper container 2 is receivable by the cover 4 (see FIG. 3).

The handle 12 is attached to the end of the lower container 1 opposite to the spout 13 thereof. The end 121 of the handle 12 proximate to the lower container 1 is arched so as to exactly fit with the lower container 1. A lateral groove 122 is formed on an appropriate position of the arched contact end 121 of the handle 12 for retaining a binding ring 11. The handle 12 is further provided with an aperture 123 from the lateral groove 122 to the outer part of the handle 12. The diameter of the aperture 123 is appropriately set so as to enable a tightening screw 124 to be threaded therethrough. Each end of the binding ring 11 is provided with a hole 111 into which the tightening screw 124 can be threaded. The tightening screw 124 screws into the two holes 111 of the binding ring 11 which encloses the lower container. Accordingly, the handle 12 is attached to the lower container 1 with the binding ring 11 being tightened by the tightening screw 124 (see FIG. 4).

Figure 4:
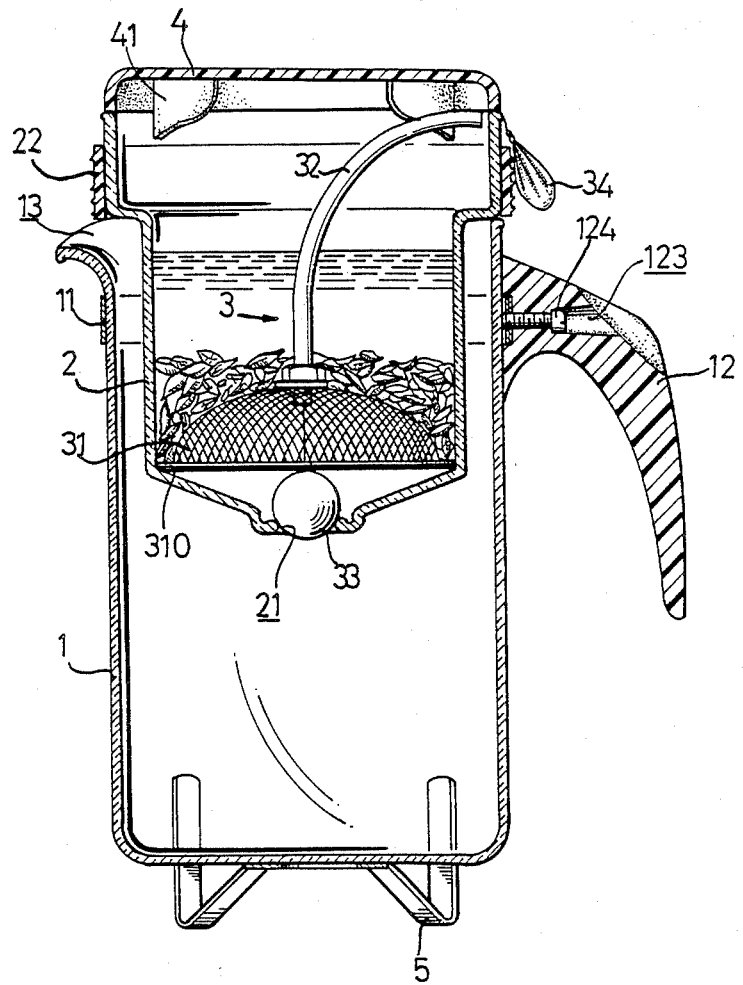
FIG. 4 is a cross-sectional view of the tea brewing apparatus of FIG. 1, wherein tea leaves are brewed in the hot water stored in an upper container.
Figure 5:
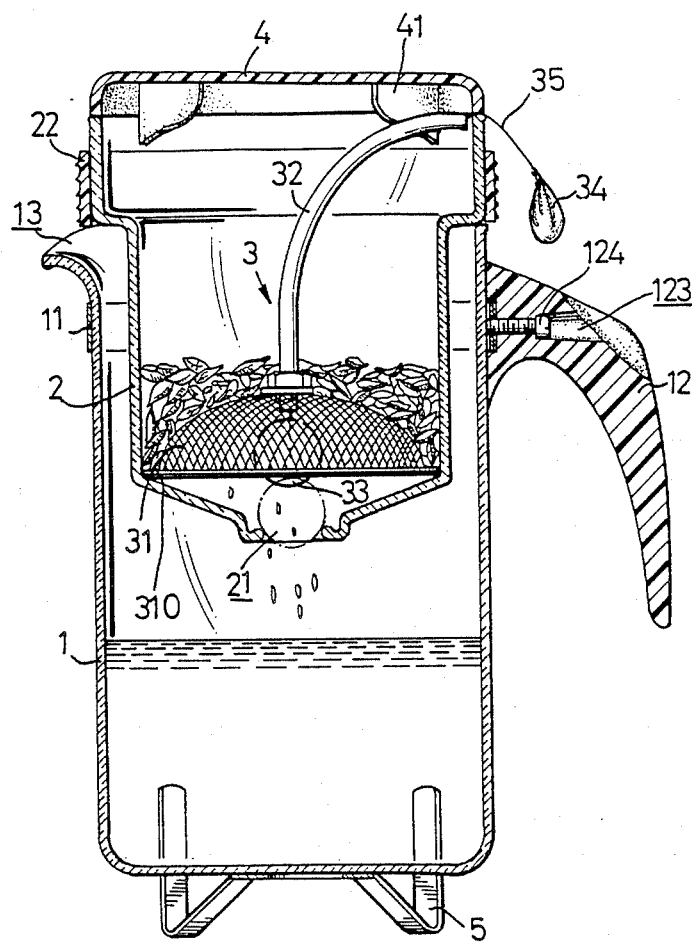
FIG. 5 is a cross-sectional view of the tea brewing apparatus of FIG. 4 wherein the tea already brewed has flowed into a lower container via a hole formed in the center of the bottom of the upper container.

Referring to FIGS. 4 and 5, the procedures of brewing tea using the present invention can be clearly seen. First, tea leaves are put into the upper container 2 which is disposed on the lower container 1, and on the ball-activated sieve 3. Since the ball 33 is heavier than the suspending element 34, it will drop on and seal the dripping hole 21 on the bottom face of the upper container 2. The steel wire 35 is made a proper length so that the ball 33 can freely rest on and seal the dripping hole 21 of the upper container 2. Secondly, hot boiling water is poured into the upper container 2 for brewing tea. FIG. 4 shows the tea leaves being brewed by the hot water in the upper container 2. When the tea is finished brewing, the suspending element 34 is pulled a distance away from the upper container 2 so as to retract the ball 33 from the dripping hole 21 and to enable the tea to flow downwards into the lower container 1, as shown in FIG. 5. The tea in the lower container 1 may be poured out via the spout 13.

The above-described procedures of brewing tea in the upper container 2 and storing tea in the lower container 1 may be repeated until the tea leaves are no longer suitable for use.

It should be noted that the stem 32 is provided on the top center grid space of the sieve 31 so that the ball 33 always moves vertically above the dripping hole 21 whenever the suspending element 34 is pulled or released. Moreover, the securing ring 310 not only secures the seive 31 on the bottom face of the upper container 2 while hot or boiling water being poured into the upper container 2, but also prevents the scraps of tea leaves from dripping into the bottom of the sieve 31 and, then, this results in leaking via the seal between of the ball 33 and the dropping hole 21.

As various possible embodiments might be made of the above invention, and as various adaptations might be made in the embodiment above set forth, it is to be understood that all matter herein described or shown in the accompanying drawings is to be interpreted as illustrative and not in a limiting sense. Thus it will be appreciated that the drawings are exemplary of a preferred embodiment of the invention.

I claim:

1. A separative tea brewing apparatus, comprising:
    a lower container having a spout on an upper edge thereof;
    an upper container, a circumferential wall thereof being stepped with a diameter of a lower portion thereof slightly smaller than that of an upper portion thereof, and a bottom face of said upper container being inclined from a periphery thereof to a center thereof and being provided with a dripping hole in said center thereof;
    a ball-activated sieve disposed on said bottom face of said upper container, comprising:
        sieve being semispherical and a securing ring encircling a peripheral edge of said sieve for securing said ball-activated sieve disposed on said bottom face of said upper container;
        an arched hollow stem being threaded on a center of said sieve;
        a steel wire being encompassed by said stem;
        a steel ball and a suspending element being connected by said steel wire, said steel ball being secured to a distal end of said steel wire inside said sieve for sealing said dripping hole, and said suspending element being secured to another distal end of said steel wire opposite to said steel ball and outside said upper container for remotely controlling movements of said steel ball;
    a top cover being disposable on a top edge of said upper container;
    a handle attached to said lower container, one end of said handle contacting with said lower container, being arched and provided with lateral groove, and an aperture being provided on said handle from said lateral groove to an outer part of said handle; and
    a binding ring enclosing said lower container, said binding ring being provided with a hole on each end thereof, and said binding ring, together with a tightening screw, binding said handle onto said lower container.

2. A separative tea brewing apparatus according to claim 1, wherein said top cover has a plurality of feet on a lower outer surface thereof so that said upper container can be received by said cover.

3. A separative tea brewing apparatus according to claim 1, wherein a seat is provided to receive said lower container so that said lower container is isolated from a table.

* * * * *